United States Patent [19]

Motoda

[11] Patent Number: 4,804,307
[45] Date of Patent: Feb. 14, 1989

[54] MODULAR STOREHOUSE

[75] Inventor: Kenro Motoda, Tokyo, Japan

[73] Assignee: Motoda Electronics Co., Ltd., Tokyo, Japan

[21] Appl. No.: 4,742

[22] Filed: Jan. 7, 1987

Related U.S. Application Data

[63] Continuation of Ser. No. 512,881, Jul. 11, 1983, abandoned.

[51] Int. Cl.⁴ ................................................ B65G 1/04
[52] U.S. Cl. ..................................... 414/282; 52/79.1;
  52/169.6; 414/609; 414/232; 414/273
[58] Field of Search ............... 414/277, 280, 281, 540,
  414/541, 542, 279, 284, 592, 609–612, 267, 273,
  282; 52/79.1, 79.5, 169.6

[56] References Cited

U.S. PATENT DOCUMENTS

| | | | |
|---|---|---|---|
| 3,148,785 | 9/1964 | Fauconnier | 414/232 X |
| 3,434,604 | 3/1969 | Haldiman | 414/281 |
| 3,501,195 | 3/1970 | Kramer | 414/542 X |
| 3,504,808 | 4/1970 | Carabateas | 414/267 |
| 3,583,584 | 6/1971 | Iacco | 414/279 |
| 3,715,040 | 2/1973 | Polus et al. | 414/273 X |
| 3,727,778 | 4/1973 | Hollenbach | 414/277 X |
| 3,730,358 | 5/1973 | Oji . | |
| 3,883,008 | 5/1975 | Castaldi | 414/280 X |
| 4,279,564 | 7/1981 | Weinert | 414/621 |

FOREIGN PATENT DOCUMENTS

| | | |
|---|---|---|
| 1759685 | 8/1971 | Fed. Rep. of Germany . |
| 2319534 | 10/1977 | Fed. Rep. of Germany . |
| 56-108603 | 8/1981 | Japan . |
| 151534 | 9/1982 | Japan .................................. 414/277 |
| 361452 | 11/1973 | Sweden . |
| 1402332 | 8/1975 | United Kingdom . |
| 1421429 | 1/1976 | United Kingdom . |
| 1505132 | 3/1978 | United Kingdom . |
| 1519941 | 8/1978 | United Kingdom . |
| 1598030 | 9/1981 | United Kingdom . |

Primary Examiner—Frank E. Werner
Attorney, Agent, or Firm—Lackenbach Siegel Marzullo & Aronson

[57] ABSTRACT

A full automatic storehouse having a storeroom composed of one or more boxes of a transportable size provided with racks for storing articles. The storeroom further comprises at least one traveling crane which is capable of reaching any desired position of the racks and an operating station for controlling the operation of the traveling crane. The storehouse may further has a lift which is moved vertically to receive the articles or discharge at the upper extremity of the storehouse and to transfer the articles to or from the crane at a lower position. This storehouse can be prefabricated in a factory or composed of several units which are prefabricated in the factory, and it can be easily set up at the site where it is installed. This storehouse can be installed under the ground to save a space on the ground.

4 Claims, 5 Drawing Sheets

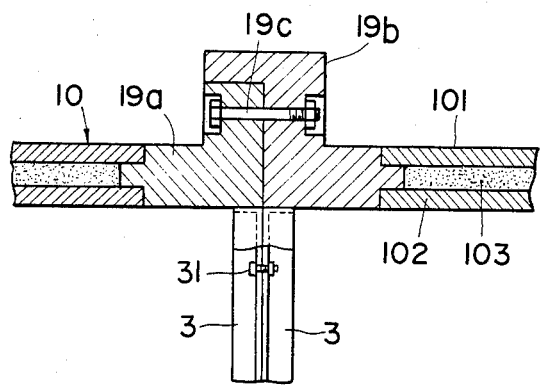
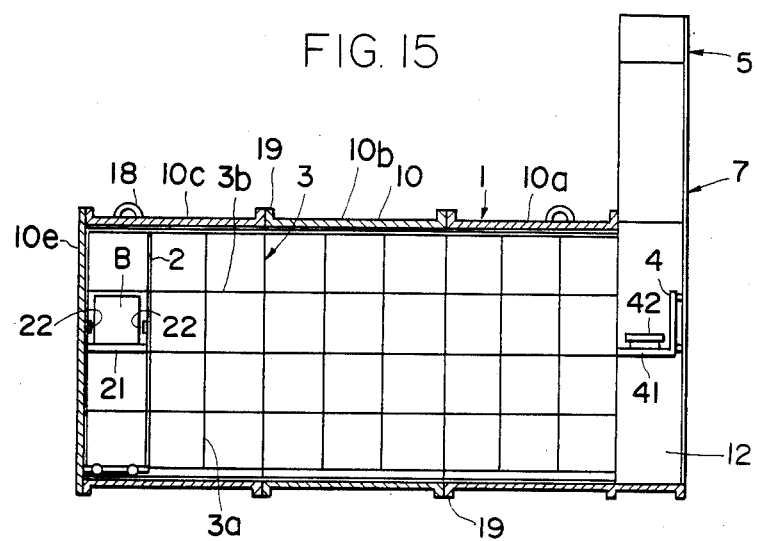
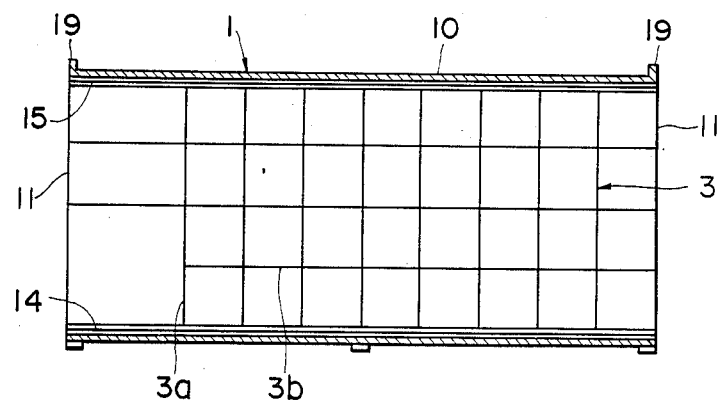

MODULAR STOREHOUSE

This application is a continuation of application Ser. No. 512,881, filed July 11, 1983, now abandoned.

BACKGROUND OF THE INVENTION

This invention relates to a full automatic storehouse for storing and controlling articles, and more particularly to a full automatic storehouse of a small scale which is suitable for use in homes or offices.

It is often the case with a general home that too many household stuff, such as furnitures, kitchenwares, clothes, books, bedclothes, etc. occupies the space of the home to use rooms effectively or keep the rooms neat and comfortable or to have easy access to desired articles. The same may be said of offices or stores.

To solve these problems, it may be proposed to utilize a multifloor automatic storehouse which is usually used in a factory etc. However, this type of automatic storehouse is, in general, fabricated at a site where it is to be installed, and accordingly it costs a lot. Moreover, such a storehouse is not suited in structure to a personal use and it necessitates considerably large space to set up it.

PURPOSE OF THE INVENTION

It is therefore an object of the present invention to provide a prefabricated full automatic storehouse which is capable of being mass-produced in a factory and therefore capable of being manufactured at a reasonable cost and which can be easily set up at any desired place, for example, under the ground to save a space on the ground required for installing the storehouse.

SUMMARY OF THE INVENTION

In accordance with the present invention, there is provided a full automatic storehouse comprising: a storeroom composed of one or more boxes of a transportable size which is or are each provided with racks for storing articles thereon; at least one traveling crane disposed in said storeroom and adapted to move for conveying articles to be stored to the racks or taking storing articles from the racks; and an operating station for controlling said traveling crane to convey the articles to and from a desired position of the racks.

BRIEF DESCRIPTION OF THE DRAWINGS

FIG. 14 is fragmentary enlarged sectional view of coupling portions of boxes constituting a storeroom;

FIG. 15 is a longitudinal sectional view of the fill automatic storehouse of FIG. 10;

FIG. 16 is a longitudinal sectional view of a box unit employable in the present invention;

DESCRIPTION OF THE PREFERRED EMBODIMENTS

Figure 1:
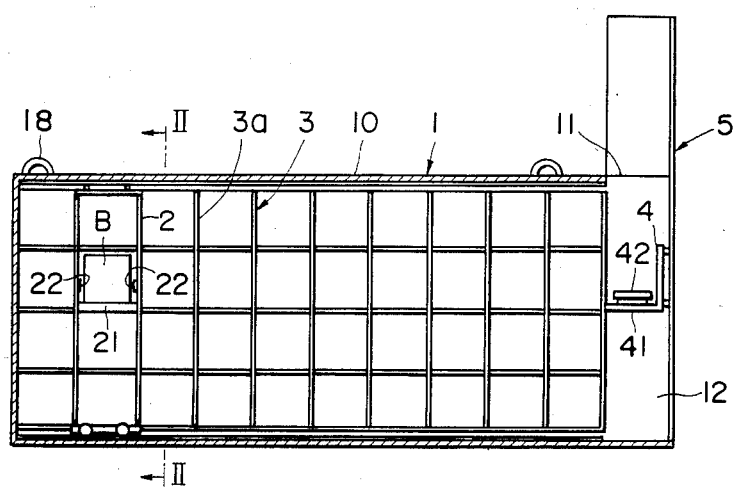
FIG. 1 is a longitudinal sectional view of one form of a full automatic storehouse according to the present invention.
Figure 2:
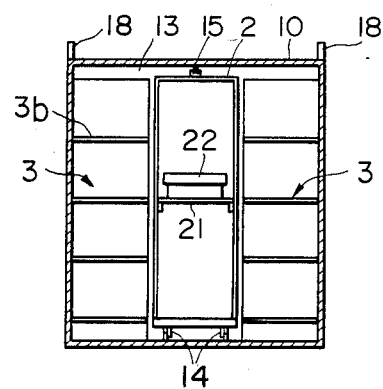
FIG. 2 is a sectional view of the full automatic storehouse taken along line II—II of FIG. 1.
Figure 3:
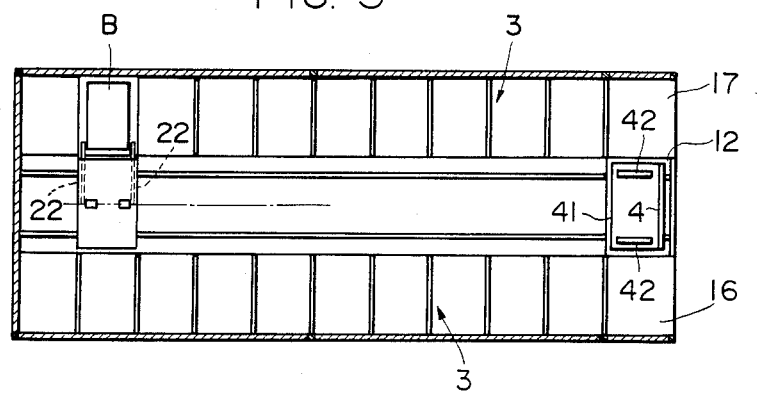
FIG. 3 is a partially cut-away plan view of the full automatic storehouse of FIG. 1.

Referring now to FIGS. 1 to 9, there is illustrated one embodiment of the present invention.

A full automatic storehouse of this embodiment comprises a storeroom 1 which is formed of a box 10, a traveling crane 2, racks 3 and a lift 4.

The box 10 has a structure hermetically sealed but an opening 11 and has a size transportable for example by a truck. The size of the box 10 is for example about 2 m in height and width and about 6 m in length. The framework of the box 10 preferably has a strength sufficient to resist a pressure of the earth when buried under the ground as will be described later. For this reason, the box 10 is formed for example of a rectangular frame and panels of iron or polyvinyl chloride fixed thereto. The box 10 may have a double-wall structure with a heat insulator inserted between the walls.

Within the box 10, the traveling crane 2 such as a stacker crane is disposed in a space 13 defined by the racks 3 which are provided on the opposite sides of the box 10 so as to extend along the substantial length thereof. The racks 3 open at the sides thereof adjacent to the space 13 to allow articles to be brought into the racks or taken out from the racks. The racks 3 may be divided into an appropriate number of sections 3a and may be partitioned with walls according to necessity.

The traveling crane 2 is adapted to run along a path formed within the space 13. In the embodiment as illustrated, the crane 2 runs in a longitudinal direction of the box 10 along guide rails 14, 14 provided centrally on a floor of the box 10 and a guide rail 15 provided centrally on a ceiling of the box 10. The crane 2 has a base 21 which is adapted to move up and down along a frame of the crane 2. The base 21 has a clamp means 22 by which an article B held on the base 21 is transferred to the rack 3 or an article B on the rack 3 is transferred to the base 21 of the crane 2. These operations are automatically carried out in response to a signal from an instruction section of an operating station 5 as will be described in detail later.

At a longitudinal end of the box 10 is formed centrally a space 12 for allowing the lift 4 to move up and down. In the embodiment as illustrated, the space 12 communicates, at its upper end, with the outside. In this arrangement, the lift 4 is associated with the traveling crane 2 so as to meet it at predetermined vertical positions thereof. The lift 4 may be a crane having a base 41 which is adapted to move up and down to receive an article to be stored from the outside or to discharge an article from the storeroom 1 at the upper extreme end of the storehouse. The lift 4 further has a transfer means 42 for example a reach fork to transfer an article on the base 41 to the base 21 of the traveling crane 2 or receive an article from the base 21 of the crane 2.

As described above, the traveling crane 2, the racks 3 and the lift 4 are preliminarily set in the box 10 to form the storeroom 1. Thus, the storeroom transportable for example by a truck can be prefabricated in a factory and mass-produced.

When it is required to set the storehouse of the present invention under the ground and there is a considerable distance from the surface of the ground to the top of the box 10, another unit separate from the box 10 may be used, in combination, for forming an extension of the passage of the lift 4. This separate unit may include the operating station 5.

On the opposite sides of the space 12 are formed spaces 16 and 17 for installing piping for air-conditioner, electrical devices, a ladder for emergency, wiring for the instruction section of the operating station 5, etc.

Figure 4:
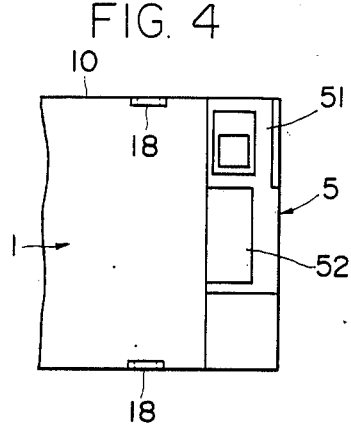
FIG. 4 is a fragmentary plan view of the full automatic storehouse of FIG. 1.
Figure 5:
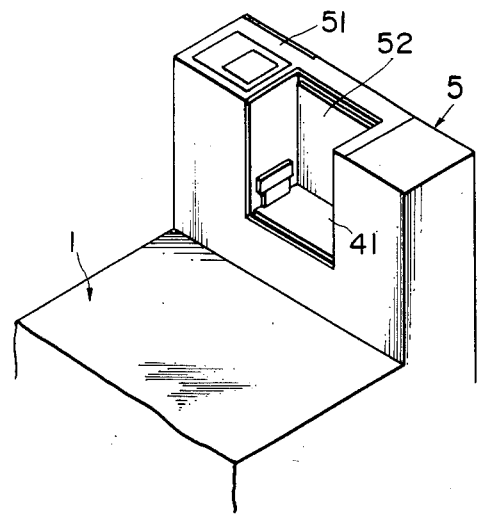
FIG. 5 is a perspective view of an operating station of the full automatic storehouse.

As can be seen from FIGS. 1, 4 and 5, the operating station 5 is combined with the storeroom 1 to constitute a storehouse. The operating station 5 includes the instruction section 51 for controlling the traveling crane 2 and the lift 4 and a port 52 for delivering or receiving articles.

When this operating station 5 is incorporated in the unit which is provided with the extension of the passage for the lift 4 as described above, this unit may be assembled, at the site where the storehouse is set, with the box 10, for example, at the opening 11 of the box 10. The wiring, piping and connection of guide rails for the lift 4 may be carried out after such assemblage. Alternatively, the operating station 5 may be incorporated in the box 10 when the operating station is not so bulky.

The port 52 is used to deliver an article to the base 41 of the lift 4 or to receive an article therefrom as described above. The port 52 may have a hatch. The hatch may be so formed that it can be opened only by an instruction from the instruction section 51 of the operating station 52. In this case, the articles stored in the storeroom 1 can be protected from theft.

The instruction section 51 includes switches, a keyboard and a microcomputer, if necessary, for remote-controlling the traveling crane 2, the lift 4, the clamp means 22 and the transfer means 42.

Figure 6:
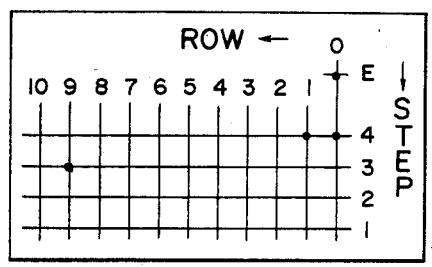
FIG. 6 is a chart showing the positions of racks diagrammatically.
Figure 7:
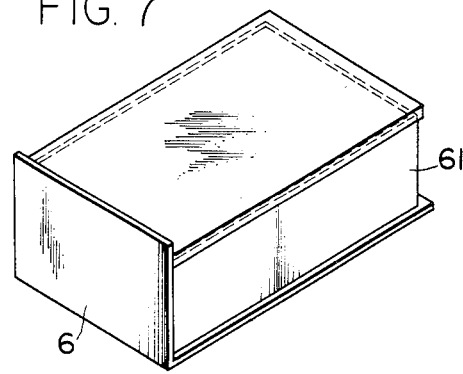
FIGS. 7 and 8 are perspective views of pallets to be placed on the racks.
Figure 8:
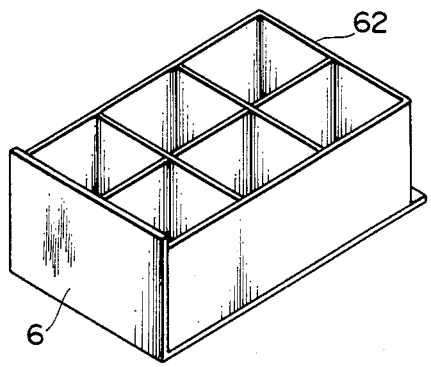

The operation of the instruction section 41 for controlling the delivery of articles will now be described referring to FIG. 6.

The traveling crane 2 makes a horizontal movement from a first row to a tenth row of the racks 3 and a vertical movement from a first step to a fourth step of the racks 3. The lift 4 makes a vertical movement in a row 0 from the first step to the fourth step and further to a step E.

The lift 4 carries out the transfer of articles at a block 0·E, i.e., the intersection of the row 0 and the step E relative to the port 52 and at a block 0·4 relative to the traveling crane 2 located at a block 1·4. The traveling crane 2, in turn, carries out the transfer of the articles relative to any desired block of the racks on either side.

More specifically, in order to convey articles to the racks 3, a carrying-in switch of the instruction section 51 is operated to move the traveling crane 2 to the block 1·4 and to call the lift 4 to the block 0·E so as to deliver the articles onto the base 41 of the lift 4. When a key associated with a block into which the articles are to be sent is depressed, the lift 4 is lowered to the block 0·4 so as to transfer the articles to the traveling crane 2 which is standing-by at the block 1·4. The transfer of the articles to the base 22 of the crane 2 is carried out, for example, by the transfer means 42. Thereafter, the traveling crane 2 moves to the desired block and stands before the desired section 3a of the rack 3. The articles on the base 21 of the crane 2 is held by the clamp means 22 and sent in or pushed into the section 3a of the rack. Thus, the storage operation is completed.

To take out the stored articles from the rack 3, first, a taking-out switch is operated and a key for a block (e.g. a block 9·3 as shown in FIG. 1) from which the articles are to be carried out is depressed. As a result, the traveling crane 2 is operated to position the base 21 before the desired section 3a of the rack 3. Then, the clamp means 22 draws the articles out of the section 3a and put them on the base 21. The crane 2 then moves horizontally to a block 1·3. The articles on the base 21 of the crane 2 is transferred by the transfer means 42 to the base 41 of the lift 4 which has been preliminarily moved to a block 0·3. After receiving the articles, the lift 4 ascends to the block 0·E, where the articles are picked up through the port 52 of the operating station 5.

The articles may be handled through a container 61 made for example of plastics which is put on an L-shaped pallet 6. This container 61 is suitable for containing ordinary clothes, bedclothes such as blankets etc., kitchenwares or the like. For small wares, books or other articles which are needed frequently may be stored through a pallet 6 having sectioned spaces 62.

The pallets 6 each have a coupling member (not shown) on the respective front faces thereof which is adapted to cooperate, for example, with a rod of the clamp means 22 extensible by a cylinder etc. The clamp means 22 and the transfer means 42 may be formed of a pincher member or an adsorber fixed to a tip end of the cylinder rod.

The pallet 6 may have rollers which are engaged with a guide rail or guide rails provided in each section 3a of the rack 3 to facilitate the insertion or drawing out of the pallet 6 into or out of the section 3a of the rack 3. The articles may, of course, be stored in each of the sections 3a without using the pallet 6 or container 61.

The box 10 has at its top surface a plurality of loops 18 which are engaged for example with hooks of a crane to carry the storeroom 1 prefabricated in the factory onto a truck or to unload the storeroom 1 to a place where the storeroom 1 is to be set.

Figure 9:
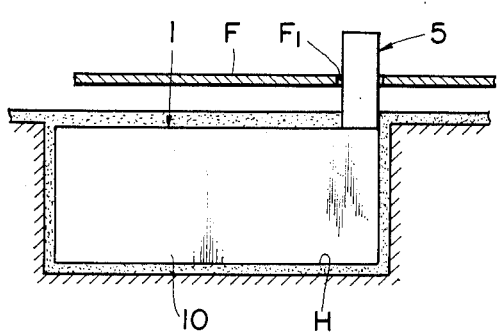
FIG. 9 is an explanatory view showing an installation example of the full automatic storehouse of FIG. 1.

To install the storehouse of the present invention, for example, a hole is excavated under a floor F of a house etc. and preferably lined with concrete to form an installing space 23 as illustrated in FIG. 9. The storeroom 1 is placed in the space 23 so as to locate the operating station 5 at an appropriate position in the house. The gaps around the storeroom 1, i.e., the box 10 are filled preferably with concrete. The passage for the lift 4 may be extended into a room etc. through an opening $F_1$ of the floor F from the box 10 as illustrated in FIG. 9. In this case, the box 10 can be fully buried under the ground and the operating station 5 can be above the floor F. Alternatively, the storeroom 1 may simply be put on the ground of a back yard. In such case, the operating station 5 may be provided within a room etc. through the wall of the house and a crane for the lift 4 may move in the horizontal direction.

Figure 10:
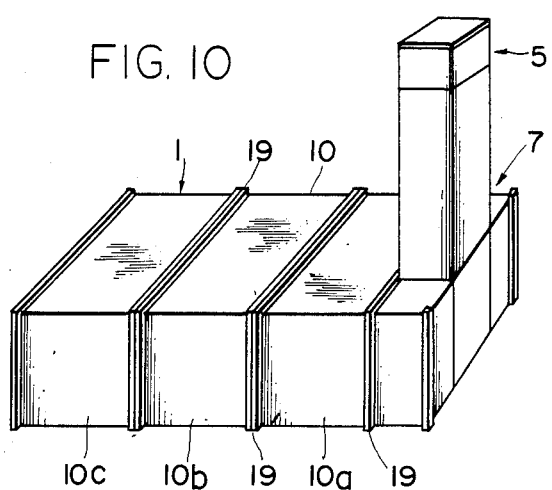
FIG. 10 is a perspective view of another form of a full automatic storehouse according to the present invention.
Figure 11:
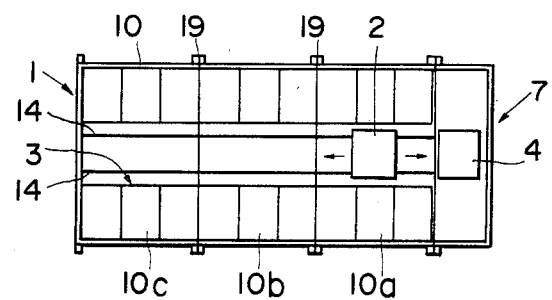
FIG. 11 is a partially cut-away plan view of the full automatic storehouse of FIG. 10.

FIGS. 10 and 11 illustrate another embodiment of the present invention, in which a full automatic storehouse is composed of a storeroom 1 formed of a plurality of boxes 10a, 10b and 10c, a unit 7 for containing a lift 4 and a unit for containing an operating station 5. The boxes 10a, 10b and 10c are each formed in a transportable size and each have openings at opposite ends in the horizontal direction and flanges 19 formed around 10a, 10b and 10c are combined in the horizontal direction through the respective flanges 19 to form the storeroom 1. In this combined state, rails 14, 14 provided on floors of the respective boxes 10a, 10b and 10c are aligned with one another and extend through the length of the storeroom 1. One end of the box 10c is provided with a wall member to close the storeroom 1 and an opposite end of the box 10a is combined with the unit 7 to install the lift 4 in the storehouse. The operating station 5 is positioned on the unit 7. The so constructed storehouse has, as a whole, substantially the same formation as that of the first embodiment except that the storeroom 1 is formed of a plurality of boxes 10a, 10b and 10c and the lift 4 is disposed in the unit separate from the storeroom 1.

Figure 12:
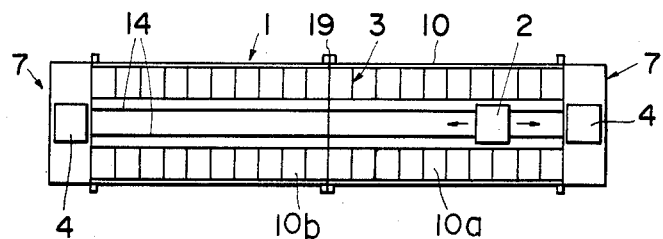
FIGS. 12 and 13 are similar partially cut-away plan views of further forms of full automatic storehouse according to the present invention.
Figure 13:
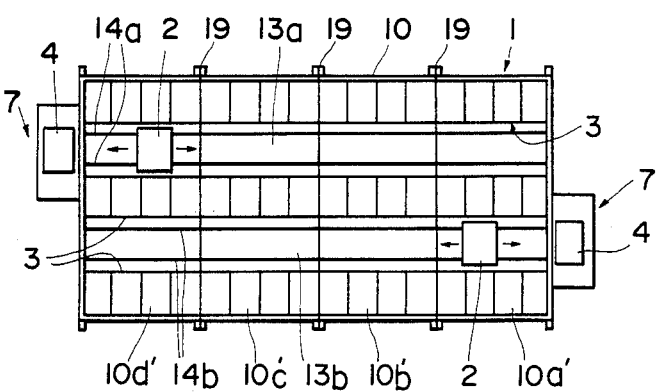

FIG. 13 illustrates a modification of the embodiment illustrated in FIGS. 11 and 12. In this modification, a storeroom 1 is formed of boxes 10a and 10b and two units 7 each containing a lift 4 are coupled to the storeroom 1 at the opposite ends thereof FIG. 13 illustrates another modification of the embodiment illustrated in FIGS. 11 and 12. In this modification, two traveling cranes 2, 2 and two sets of guide rails 14a, 14b are provided within a storeroom 1 which is formed of boxes 10a', 10b', 10c' and 10d' and three racks 3, 3, 3 are provided in association with the traveling cranes 2, 2. In this case, the center rack 3 may be accessible by either of the cranes 2. Two units 7, 7 are coupled to the storeroom 1 so as to be associated with the respective traveling cranes 2, 2.

In order to couple the boxes to form one storeroom 1 as described above, the coupling flanges may for example have a structure as illustrated in FIG. 14. In this example, the boxes 10 are firmly coupled to each other through a female flange 19a and a male flange 19b secured by a bolt 19c.

As illustrated in FIG. 14, walls of the boxes 10 may be each formed of an outer member 101, an inner member 102 and an intermediate member 103. Aggregate may also be employed in the wall. Racks 3, 3 provided within the boxes 10, 10 are combined by a bolt 31 as illustrated in FIG. 14. Guide rails (not shown) for a crane 2 may be coupled to each other in a similar manner.

FIG. 15 is a longitudinal sectional view of the storehouse of FIGS. 10 and 11. 10e is a wall panel attached to the end of the box 10c to close the storeroom 1. Instead of using the panel 10e, another type of box which has an end wall may be employed in place of the box 10c.

FIG. 16 shows a detailed structure of a box 10 used for example in the embodiment of FIGS. 11 and 12. The box 10 has openings 11, 11 at the opposite ends in the horizontal direction and flanges 19, 19 around the peripheries of the respective openings 11, 11. A rack 3 may be sectioned by plates 3a, 3b in a way suited to the use of the rack 3. If necessary, such a larger space as provided at the left, lower portion of the box 10 in FIG. 16 may be reserved.

Figure 17:
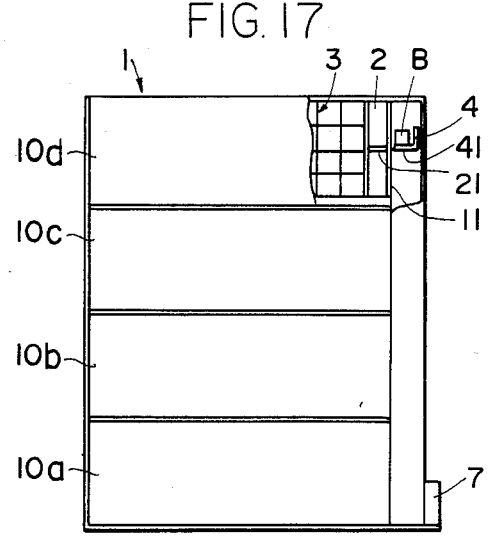
FIG. 17 is a partially cut-away side elevational view of a still another form of a full automatic storehouse according to the present invention.
Figure 18:
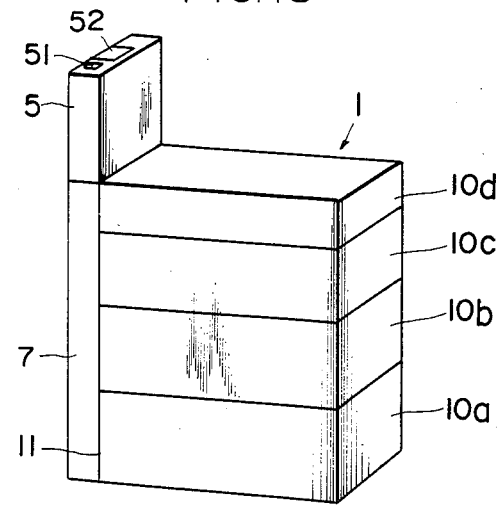
FIG. 18 is a perspective view of a still another form of a full automatic storehouse according to the present invention.

In FIG. 17, there is illustrated a still another embodiment of the present invention. A plurality of boxes 10a, 10b, 10c and 10d are laid upon one another to form a storeroom 1. The boxes may be locked relative to each other through appropriate means such as projections and recesses formed at the tops and the bottoms of the boxes, respectively. The boxes 10a to 10d each have an opening 11 which is communicated with the inside of a unit 7 for containing a lift 4. The unit 7 extends through at least the height of the storeroom 1 so that the lift 4 may have access to any of the boxes 10a to 10d and a traveling crane 2 provided in each of the boxes. In the embodiment illustrated in FIG. 17, an operating station 5 is provided at the bottom of the storehouse which is set up on the ground or above the ground. Alternatively, the operating station 5 may be provided at the top of the storehouse as illustrated in FIG. 18 so that the storehouse may be installed under the ground. In the embodiment illustrated in FIG. 18, boxes of different heights are piled on one another to form a storeroom, so that, for example, small articles may be stored in a low box such as the box 10d and large articles may be stored in a high box such as the box 10a.

Figure 19:
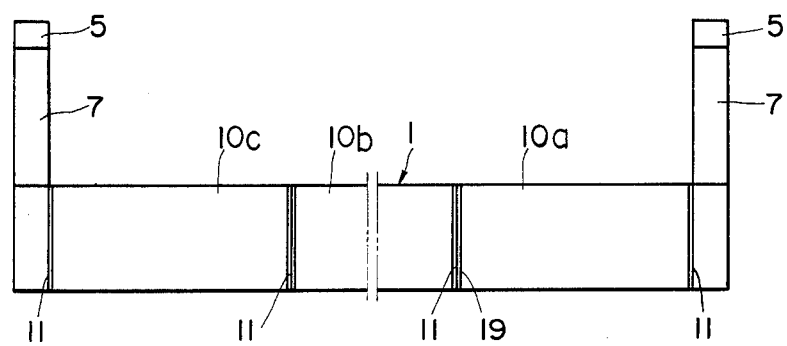
FIG. 19 is a side elevational view of a still another form of a full automatic storehouse according to the present invention.

According to a still another embodiment of the present invention, plural boxes of smaller size may be combined in the horizontal direction to form a storehouse having a desired length as illustrated in FIG. 19. In this case, the transportation of the units of the storehouse can be facilitated.

Figure 20:
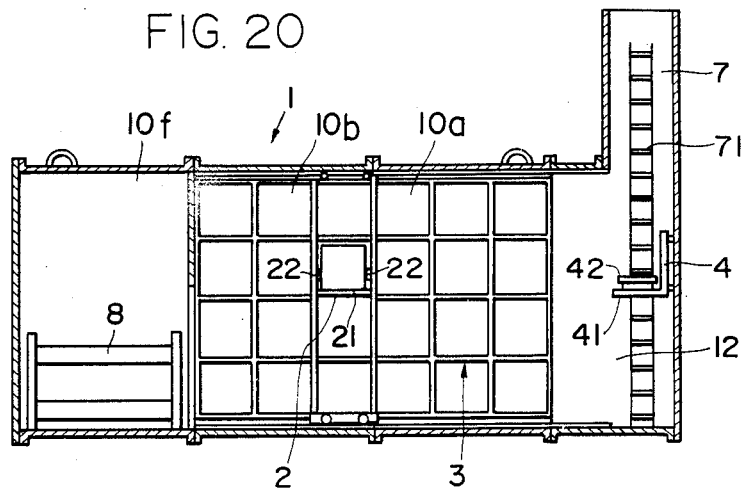
FIG. 20 is a longitudinal sectional view of a still another form of a full automatic storehouse according to the present invention.

In FIG. 20, there is shown a still another embodiment of the present invention, in which a box 10f is reserved for use as a retreat or a shelter. An air conditioner or an air cleaner may be provided in this space. Of course, a bed 8, a refrigerator, food, water, etc. may be provided or stored according to necessity.

Although the storerooms of the foregoing embodiments are formed of a box or boxes, they may be formed of a cylindrical member or members.

As described above, according to the present invention, the storehouse can be set up easily by using a prefabricated storeroom or prefabricated boxes or other units, so that the cost of the storehouse can be reduced very much. When the storeroom is composed of prefabricated box units, a variety of formations and sized may be obtained easily. In addition, the storehouse of the present invention may be installed under the ground, a space on the ground can be used for another purpose effectively.

I claim:

1. A fully automatic storehouse comprising:
   a self-contained sealed storeroom of transportable size adapted to be buried underground and containing a plurality of modular racks for storing articles therein, the racks being arrayed to form a pair of vertical rectangular storage matrices which extend horizontally in spaced parallel relationship so as to define a parallel space extending therebetween, said storage matrices being horizontally and vertically coterminous;
   a traveling crane in said space horizontally movable therein between and parallel to said storage matrices, said crane having a vertically movable base adapted to convey storage articles to and from any vertical level of said storage matrices, said crane further having a clamp member for transferring storage articles between said base and said racks;

a lift adjoining said storage matrices at one of the pairs of coterminous horizontal ends thereof and vertically extending from the interior of said storeroom to a location exterior to and substantially vertically elevated with respect to said storeroom, said lift having a vertically movable base therein adapted to convey storage articles between such exterior location and said storeroom;

an operating station at said exterior location for controlling operation of said crane and said lift so that solely be means of such operation storage articles can be conveyed to and from any selected rack in said matrices and to and from said storeroom and said exterior location; and said storeroom is assembled from a plurality of adjoining boxes, said boxes are each formed in a transportable size and each box having openings at opposite ends with coupling flanges formed around the peripheries of the respective openings;

said boxes being coupled to form one storeroom by being coupled to each other with each box having a female flange around one periphery and having a male flange around the other periphery, and with the male flange of one box coupled to the female flange of an adjoining box with a securing means for coupling said male flange to said female flange;

whereby said storeroom may be buried underground and the operating station located above ground, communication therebetween being effected by said lift.

2. A fully automatic storehouse as claimed in claim 1, wherein said storeroom is assembled from a plurality of horizontally adjoining boxes.

3. A fully automatic storehouse as claimed in claim 1, wherein said storeroom is assembled from a plurality of vertically adjoining boxes.

4. A fully automatic storehouse as claimed in claim 1, wherein said lift comprises transfer means for transferring storage articles between the base of said crane and the base of said lift.

* * * * *